United States Patent Office 3,834,910
Patented Sept. 10, 1974

3,834,910
PENCIL LEAD
Atsuhiko Mukai and Yoshio Mori, Sagamihara, Japan, assignors to Teijin Limited, Osaka, Japan
No Drawing. Filed Nov. 6, 1972, Ser. No. 303,872
Claims priority, application Japan, Nov. 13, 1971, 46/90,772
Int. Cl. C09d 13/00
U.S. Cl. 106—19                    2 Claims

ABSTRACT OF THE DISCLOSURE

A pencil lead which consists essentially of a powdery coloring agent bonded by an uncured epoxy resin of the 2,2 - bis(4' - hydroxyphenyl)propane/epichlorohydrine which is solid at room temperature.

---

This invention relates to a pencil lead. More particularly, the invention relates to a pencil lead consisting essentially of a powdery coloring agent bonded by a specific epoxy resin, which has a sufficiently practical strength at a hardness of grade H or HB and is excellent in graphic characteristics.

In general, pencil leads are prepared by bonding powdery coloring agents with binders. For instance, in the case of commercially available graphite leads, natural graphite powder is used as the coloring agent and natural clay is used as binder for bonding the graphite powder. More specifically, since a clay which has contained a suitable amount of water exhibits plasticity, by utilizing this property, a mixture of graphite powder and such clay is extruded under pressure from small holes to mold it into the lead-like form, and then it is dried and fired at about 1100° C. to sinter the clay and impart a desired strength to the product lead.

Pencil leads prepared by such conventional method have the following two fatal defects.

(1) Since a natural clay is used as a binder, unevenness in quality is great and it is difficult to obtain products which are completely uniform in hardness, diameter and the like. Further, in the case of leads having a high hardness (harder than grade 3H), clay particles tend to scratch on paper at the time of writing and it frequently happens that writing cannot be conducted smoothly.

(2) Since the products are obtained inevitably through the firing step, it is impossible to obtain continuous leads having and endless length.

The above defect (1) can readily be understood from the fact that in commercially available pencils, the hardness or lead diameter differs more or less in pencils of the same grade.

The above defect (2) has a great significance when a casing of the pencil is formed from a plastic material or its foamed product. The reason is as follows:

Natural special woods such as incense cedar produced in California, U.S.A., have heretofore been used as materials for casings of pencils, but the recent rise in price of such woods has invited movements of substituting a plastic material or its foamed product for such special wood in the art of pencil manufacture. In this case, if slats are formed from a plastic material one by one as in the case of wooden casings, the manufacturing cost becomes extremely high and the object of the substitution cannot be attained. For this reason, when a plastic material is used for formation of pencil casings, a technique similar to the technique adopted for the manufacture of coated electric wires is employed. Namely, it has been tried to obtain a pencil of an endless length at a stroke by coating the periphery of a lead with a plastic material or its foamed product with use of an apparatus resembling a die customarily used for coating electric wires. However, in order to make such process practically workable, it is indispensable that leads should be continuous and have an endless length.

In order to provide pencil leads free of the above defects, various attempts have been made to utilize plastics as binders instead of clays, but none of them have succeeded in giving satisfactory results. For instance, the specification of U.S. Pat. No. 3,262,904 teaches the use as a binder of a mixture of polystyrene and high pressure polyethylene or a mixture of an acrylonitrile/styrene copolymer resin and high pressure polyethylene. However, as is disclosed in Examples of the above specification, the lead of No. 2½ grade (corresponding to grade F) has a bending strength of only 7300 p.s.i. (5110 g./mm.²), and, from the viewpoint of the strength the lead proposed in the above specification cannot be a practically satisfactory substitute for the conventional product. Further, the specification of U.S. Pat. 3,360,489 proposes the use as a binder of a polymer having a colloidal particle size, such as PVC latex. However, when such polymer of the latex form is employed, though the firing step can be omitted, troublesome operations should be conducted for removing water from such polymer. We reproduced the teachings of the above specification to determine the utility of such polymer of the latex form and found that, contrary to the disclosures of the above specification, it was impossible to obtain leads of a hardness of grade H or HB having a practically satisfactory strength. Again, it has been proposed to use as a binder a thermosetting resin such as furan resin or melamine resin. However, in each case there are obtained only leads of a very high hardness and it is impossible to obtain pencil leads of a hardness of grade H or HB.

As described above, according to conventional techniques using plastic materials as binders for powdery coloring agents, it has been impossible to obtain pencil leads of practically sufficient quality as regards the hardness of grade H or HB.

Accordingly, it is a primary object of this invention to provide pencil leads consisting essentially of a powdery coloring agent bonded by a plastic material binder, which exhibits satisfactory properties at a hardness of grade H or HB.

We have found that this object of this invention can be attained when an uncured epoxy resin of the 2,2,-bis (4'-hydroxyphenyl)propane/epichlorohydrin type which is solid at room temperature is used as a binder for a powdery coloring agent.

By the term "an uncured epoxy resin of the 2,2-bis-(4'-hydroxyphenyl) propane/epichlorohydrine type which is solid at room temperature" is meant an epoxy resin of the 2,2-bis(4' - hydroxyphenyl)propane/epichlorohydrin type which is not incorporated with a curing agent and is in the thermoplastic state and has an average molecular weight of from about 700 to about 7000, preferably from about 1000 to about 6000. In general, when an epoxy resin is used as a binder, a three-dimensional cross-linked structure is formed in the resin by curing it with a curing agent such as amines and acid anhydrides. In contrast to such customary manner of the use of epoxy resins, this invention is characterized in that an epoxy resin of the 2,2 - bis(4'-hydroxyphenyl)propane/epichlorohydrin type is used as a binder in the uncured state not incorporated with any curing agent. In the instant specification, such epoxy resin will sometimes be referred to merely as "epoxy resin."

As commercially available epoxy resins to be used preferably in this invention, there may be mentioned, for example, Epikote 1004 (molecular weight=about 1400; melting point=96–104° C.), Epikote 1007 (molecular weight=about 2900; melting point=122–131° C.), Epikote 1009 (molecular weight=about 3750; melting point=144–158° C.), Epikote 1010 (molecular weight= about 5000; melting point=155–165° C.), Araldite 6084 (melting point=95–105° C.), Araldite 6097 (melting point=125–135° C.), Araldite 6099 (melting point= 145–155° C.), DER 664 (melting point=95–105° C.), DER 668 (melting point=120–140° C.) and DER 669 (melting point=135–155° C.) Epikote, Araldite and DER are trade names for products of Shell International Chemicals Corporation, Ciba Products Company and Dow Chemical Company, respectively.

All of powdery coloring agents that have been used for the preparation of graphite leads and colored leads, such as natural crystalline graphite, natural amorphous graphite, artificial graphite and various organic pigments, may be used in this invention as the powdery coloring agent.

In a preferable embodiment of preparing a graphite lead according to this invention, graphite powder, finely divided powder of the above-mentioned epoxy resin and, if desired, a hardness adjuster are blended by means of a mixer, the resulting powdery mixture is dried at about 80° C. and melt-extruded from an extruder in which the maximum cylinder temperature is adjusted within the range of from 140 to 180° C., the extruded strands are hot-cut into pellets, and finally the pellets are extrusion-molded by means of a lead-forming extruder at the end of which a die having holes of a diameter of 2 mm. is mounted. Thus, graphite leads are obtained.

The hardness adjuster may be used in an amount necessary for imparting the desired hardness to the product lead. When the hardness adjuster is not employed, the resulting graphite lead has a hardness of 7H or 8H. Metal soaps are usually employed as such hardness adjuster. Among metal soaps, calcium and aluminum salts of stearic acid and lauric acid are especially useful because they are non-toxic.

Examples of the mixing ratio of the graphite powder, epoxy resin powder and hardness adjuster are as follows:

|  | Mixing ratio (percent by weight) | | |
| --- | --- | --- | --- |
|  | Graphite powder | Epoxy resin | Hardness adjuster |
| Graphite lead of HB hardness | 70 | 12 | 18 |
| Graphite lead of H hardness | 70 | 18 | 12 |
| Graphite lead of 4H hardness | 70 | 20.5 | 9.5 |
| Graphite lead of 7H hardness | 65 | 35 | 0 |

In the case of graphite leads of a hardness of grade HB or H, it is possible to heighten the graphite concentration up to about 75% by weight. It is convenient to conduct the melt-kneading of the starting material mixture in an extruder in a manner as described above, but it is also possible to employ a Banbury mixer or roll mill to effect the melt-kneading of the starting material mixture. Further, a part of graphite may be replaced by other black pigment, and various additives customarily used for the production of molded articles of plastics, such as stabilizers and fillers, may be incorporated into the starting material mixture.

In another embodiment of this invention colored leads are prepared. In this embodiment, organic pigments are used as the powdery coloring agent. These pigments are selected from organic pigments which have no toxicity, can give a desired color on writing and have a heat resistance sufficient to withstand high temperatures adopted at the molding step. In the case of graphite leads, graphite powder incorporated as the powdery coloring agent acts also as a filler giving rigidity to the product. In the case of colored leads, however, it is necessary to incorporate a filler (white color) exhibiting such rigidity-imparting action. Use of talcum powder is most suitable for this purpose. In the case of colored leads as well as in the case of graphite leads, in order to reduce the hardness, it is necessary to incorporate as a hardness adjuster a metal soap as calcium stearate.

Preferable examples of the composition of the starting material mixture for a colored lead are as follows:

Mixing Ratio (on the weight basis)

Organic Pigment _____ 7–10
Epoxy Resin _____ 16–20
Calcium Stearate _____ 13–16
Talcum Powder _____ 55–65

For the preparation of colored leads from such starting materials, an extrusion molding method such as described above with respect to graphite leads may be conveniently adopted. As in the case of graphite leads, various additives customarily used in the production of molded articles of plastics may also be incorporated in the above starting material mixture to be used for the preparation of leads.

In this invention, in order to reduce the manufacturing cost, up to 50% by weight of the epoxy resin may be replaced by other thermoplastic resin. As such thermoplastic resin, there may be employed acrylonitrile/styrene copolymer resin and ethyl cellulose. When more than 50% by weight of the epoxy resin is replaced by such thermoplastic resin, the resulting lead has a strength as the lead taught in the above-quoted specification of U.S. Pat. 3,360,489. Therefore, it is not preferred to incorporate such thermoplastic resin in such a great amount.

This invention will now be illustrated in more details by reference to non-limitative Examples.

EXAMPLE 1

This Example illustrates the preparation of graphite lead of a degree of hardness HB.

1200 g. of an epoxy resin (Epikote 1010 manufactured by Shell International Chemicals Corporation; molecular weight=about 5000; melting point=155–165° C.) which had been ground to pass through a 20-mesh sieve, 7000 g. of natural crystalline graphite (average particle size=6$\mu$) and 1800 g. of calcium stearate were well mixed in a Henschel mixer, and the mixture was dried at 85° C. for 5 hours. Then, the mixture was fed to an extruder at the front end point of which a die having holes of a diameter of 3.0 mm. was mounted, and the melt-extrusion was conducted at a cylinder temperature of 130° C. (at the rear)—140° C. (at the front) and at a die temperature of 130° C. The extruded strands were hot-cut into pellets having a length of 4–6 mm.

The so obtained pellets for formation of leads were fed to a lead-molding extruder at the end point of which a die having pores of a diameter of 2.0 mm. was amounted, and were continuously extruded at a cylinder temperature of 140° C. (at the rear)—145° C. (at the center)—150° C. (at the front) and at a die temperature of 140° C. The extrudate was continuously wound onto a drum of a diameter of 1.5 m. to obtain a graphite lead of an endless length having a diameter of 2.0 mm.

When the hardness of the resulting graphite lead was compared with those of commercially available graphite leads, it was found that the hardness was of grade HB. The bending strength of the so obtained graphite lead as measured according to the method of JIS S–6005–1971 after one week's conditioning was 6400 g./mm.$^2$. This strength-measuring method according to JIS S–6005–1971 is conducted as follows:

A lead is supported by two points, and a concentrated load is laid at the central point between the two supporting points. The concentrated minimum load that can break the lead is measured, and the flexural strength is calculated by the following formula:

$$f = \frac{8PL}{\pi d^3}$$

wherein $f$ designates the bending strength (g./mm.$^2$), P stands for the minimum concentrated load (g.) laid on the center that can break the lead, L indicates the distance (mm.) between the two supporting points (usually adjusted to 60 mm.), and $d$ designates the diameter of the lead.

Conventional endless graphite leads prepared by employing plastics as binders have a bending strength of 3500 to 5000 g./mm.$^2$, and the minimum bending strength passing the test standard stipulated by JIS is 500 g./mm.$^2$ in the case of a lead of a hardness of grade HB. In view of the foregoing, it will readily be understood that the product of this invention obtained in this Example is very excellent. In fact, when it was actually used for writing, it was not broken at all.

A graphite lead was prepared by repeating the above procedures except that 500 g. of an acrylonitrile/styrene copolymer (Tyril manufactured by Asahi Dow Chemicals) and 700 g. of the epoxy resin were used instead of 1200 g. of the epoxy resin. Namely, 500 g. of the epoxy resin was replaced by the same amount of the above copolymer. The bending strength of the so prepared graphite lead was 6200 kg./cm.$^2$.

For comparison, a graphite lead was prepared by repeating the above procedures except that 1200 g. of the above acrylonitrile/styrene copolymer was used instead of 1200 g. of the epoxy resin. The bending strength of the so prepared graphite lead was 5000 g./mm.$^2$. A lead of a bending strength of such low level has no high practical value, because the point portion of the lead tends to be broken on writing.

EXAMPLE 2

This Example illustrates the preparation of a graphite lead of a hardness of grade H.

A graphite lead was prepared in the same manner as in Example 1 by changing conditions in the following three points (1) to (3):

(1) Starting Materials:
Epoxy resin (Epikote 1009 manufactured by Shell International Chemicals Corporation; molecular weight=about 3750; melting point=144–158° C.)—1800 g.
Graphite powder—7000 g.
Calcium stearate—1200 g.

(2) Strands Extrusion Conditions:
Cylinder temperature—160° C. (at the rear)—170° C. (at the front)
Die temperature—160° C.

(3) Lead-Molding Conditions:
Cylinder temperature—150° C. (at the rear)—155° C. (at the center)—160° C. (at the front)
Die temperature—150° C.

The resulting graphite lead had a bending strength of 8300 g/mm.$^2$, and it was not broken when used for writing.

A graphite lead having a bending strength of 8000 g./mm.$^2$, which was not broken when used for writing, was also prepared by repeating the above procedures except that of 1800 g. of the epoxy resin, 700 g. was replaced by ethyl cellulose.

EXAMPLE 3

This Example illustrates the preparation of colored leads.

Red, blue and yellow colored leads were prepared in the same manner as in Example 1 except that the following three changes (1) to (3) were made to the preparation conditions:

(1) Starting materials

| | Mixing ratio (on the weight basis) | | |
|---|---|---|---|
| | Red | Blue | Yellow |
| Components: | | | |
| Epoxy resin (same as used in Example 1) | 9.0 | 9.0 | 11.0 |
| Acrylonitrile/styrene copolymer (same as used in Example 1) | 8.0 | 8.0 | 8.0 |
| Calcium stearate | 15.0 | 15.0 | 14.0 |
| Talc (average particle size=2.0 μ) | 60.0 | 60.0 | 60.0 |
| Cromophthal Yellow A2R (Color index number=70600) | | | 7.0 |
| Helio Fast Red BBN (Color index number=12370) | 8.0 | | |
| Heliogen Blue 6900 (Color index number=74160) | | 8.0 | |

(2) Strands extrusion conditions

Cylinder temperature — 145° C. (at the rear); 150° C. (at the front).
Die temperature — 145° C.

(3) Lead-molding conditions

Cylinder temperature — 130–140° C. (at the rear); 135–140° C. (at the center); 140–145° C. (at the front).
Die temperature — 125–130° C.

Fine letters and lines could be written with use of each of the so prepared colored leads, and written letters and lines could be erased almost completely by an eraser. These colored leads had the following bending strength:

G./mm.$^2$
Red Lead _____ 5500
Blue Lead _____ 5520
Yellow Lead _____ 5350

What we claim is:

1. A slender, cylindrical pencil lead which consists essentially of a powdery coloring agent bonded by an uncured epoxy resin having an average molecular weight of from about 700 to about 7000 which is a reaction product of 2,2-bis(4'-hydroxyphenyl)propane with epichlorohydrin and which is solid at room temperature.

2. A slender, cylindrical pencil lead which consists essentially of a powdery coloring agent bonded by a mixture of at least 50% by weight of an uncured epoxy resin having an average molecular weight of from about 700 to 7000 which is a reaction product of 2,2-bis(4'-hydroxyphenyl)propane with epichlorohydrin and which is solid at room temperature and up to 50% by weight of a thermoplastic resin selected from acrylonitrile/styrene copolymer and ethyl cellulose.

References Cited

UNITED STATES PATENTS

| 2,879,235 | 3/1959 | Condo | 260—13 |
| 2,917,777 | 12/1959 | Pischel | 18—47.5 |
| 3,336,257 | 8/1967 | Alvey | 260—47 |
| 3,360,489 | 12/1967 | Grossman et al. | 260—23 |

OTHER REFERENCES

Lee and Neville: "Handbook of Epoxy Resins," pp. 2–1 to 2–3, 14–47 to 14–49, 24–6, and 24–25 to 24–28, McGraw-Hill, 1967.

Gordon et al.: "Surface Coatings & Finishes," pp. 139–149, Chemical Publishing, 1954.

WILLIAM H. SHORT, Primary Examiner

E. A. NIELSEN, Assistant Examiner

U.S. Cl. X.R.

260—13 R, 41 C, 41R